US008294833B2

(12) United States Patent
Deppe

(10) Patent No.: US 8,294,833 B2
(45) Date of Patent: Oct. 23, 2012

(54) IMAGE PROJECTION METHOD

(75) Inventor: Carsten Deppe, Aachen (DE)

(73) Assignee: Koninklijke Philips Electronics N.V., Eindhoven (NL)

( * ) Notice: Subject to any disclaimer, the term of this patent is extended or adjusted under 35 U.S.C. 154(b) by 229 days.

(21) Appl. No.: 12/680,595

(22) PCT Filed: Sep. 25, 2008

(86) PCT No.: PCT/IB2008/053898
§ 371 (c)(1),
(2), (4) Date: Mar. 29, 2010

(87) PCT Pub. No.: WO2009/044314
PCT Pub. Date: Apr. 9, 2009

(65) Prior Publication Data
US 2010/0208148 A1    Aug. 19, 2010

(30) Foreign Application Priority Data
Oct. 5, 2007   (EP) .................................... 07117947

(51) Int. Cl.
*H04N 5/64* (2006.01)
*H04N 9/31* (2006.01)
(52) U.S. Cl. ...................................... 348/744; 348/750
(58) Field of Classification Search .............. 348/744, 348/750, 756, 758–760, 795, 797–803; 353/34, 353/82, 94; 359/27, 331, 719; *H04N 5/64, H04N 9/31, 5/74, 3/12, 5/66, 9/12, 5/70, H04N 9/30*
See application file for complete search history.

(56) References Cited

U.S. PATENT DOCUMENTS

| 5,534,950 | A  | * | 7/1996 | Hargis et al. ................... 348/758 |
| 6,351,324 | B1 |   | 2/2002 | Flint |
| 2002/0060753 | A1 |   | 5/2002 | Flint |
| 2003/0030756 | A1 |   | 2/2003 | Kane et al. |
| 2007/0085936 | A1 |   | 4/2007 | Callison et al. |
| 2007/0153862 | A1 |   | 7/2007 | Shchegrov et al. |

FOREIGN PATENT DOCUMENTS

| EP | 1286533 A2 | 2/2003 |
| EP | 1564989 A1 | 8/2005 |
| JP | 2003084707 | 3/2003 |
| JP | 2006053240 | 2/2006 |
| WO | 9418802 A1 | 8/1994 |
| WO | 2006081296 A2 | 8/2006 |

OTHER PUBLICATIONS

Haring: "Miniature Pulsed Laser Sources: Repetition Rates From Kilohertz to Gigahertz"; Dissertation Submitted to the Swiss Federal Institute of Technology Zurich, Dec. 2001, 119 Page Document.

* cited by examiner

*Primary Examiner* — Sherrie Hsia

(57) ABSTRACT

An image projection method comprises the steps of a) obtaining an image pixel array for the image to be projected; b) obtaining a plurality of pixel allocation arrays for the image pixel array, whereby each pixel allocation array comprises occupied elements and vacant elements; c) generating a trigger pulse train for a laser light source according to a pixel allocation array, whereby a trigger pulse is generated for each occupied element; d) generating a modulation signal for the laser light source; e) switching the laser light source with the trigger pulse train and modulating the laser light source with the modulation signal to generate a laser light pulse sequence for a sub-frame image; f) and scanning the laser light pulse sequence to traverse the display; thereby, the steps c) to f) are carried out for each pixel allocation array so that the image appears on the display.

10 Claims, 9 Drawing Sheets

IMAGE PROJECTION METHOD

FIELD OF THE INVENTION

The invention describes an image projection method, and a projection system.

BACKGROUND OF THE INVENTION

Projection displays offer an alternative to flat-screen displays such as plasma and TFT displays, in which the image is directly generated on the display surface. In one type of image projection system, a video signal is processed to create an image in a small display panel, and this image is magnified and projected onto a projection display, or screen. In a scanning projection system, on the other hand, the image is scanned in a pixel-wise or line-wise manner onto the projection display. A screen can be a backdrop in the case of a front-projection system—the projector or 'beamer' is in front of the screen and is usually positioned behind the viewer, for example suspended from the ceiling, in order to project the image onto the front of the screen; or a television screen in the case of a rear-projection system, in which all components are contained in a single device, and the image is projected onto the screen from behind.

State of the art projection displays often utilise a high-intensity discharge (HID) lamp or ultra-high pressure (UHP) lamp to produce the required bright beam of white light. The white light is then either split into the light primaries red, blue and green by means of dichroic filters, or passed through a colour wheel with red, blue and green colour filters, and the primaries are then directed at a two-dimensional display panel to generate a sequence of 'sub-images' in the primary colours. The display panel can be, for example, an array of micro-mirrors as in DLP® (Digital Light Processing®) or an LCD or LCoS (Liquid Crystal on Silicon) array. The display panel can also be referred to as a 'micro-display', since an image is first rendered on this very small element before being projected onto a screen or backdrop for viewing by a user. For example, in a DLP system, the light primaries are directed in quick succession at the display panel to create red, blue and green sub-images which are projected onto the display and perceived as a combined image by the viewer.

The state of the art projection systems that use UHP lamps have the disadvantage of requiring a very complex optics system for obtaining the primaries from the white light source. Another drawback shared by these systems is that the lamp may fail if not driven according to certain criteria. Furthermore, such a lamp can be subject to blackening as the lamp gets older, so that the projected image eventually suffers from a decline in quality. Replacement lamps are also quite expensive from the point of view of the consumer.

Instead of using a single white UHP light source, it is possible to use three primary colour light sources such as red, green and blue lasers. Up until recently, the lasers available for use in laser-based projection systems have been relatively large and expensive, particularly those for generating green and blue light, since green or blue laser light must be generated using an additional frequency conversion. However, affordable compact semiconductor diode lasers that use frequency doubling to obtain blue or green light from an infrared laser are coming onto the market. An example of such a semiconductor laser source is the electrically pumped Vertical External Cavity Surface-Emitting Laser, or VECSEL. Directly-emitting blue lasers are already available for applications such as BluRay® and HD DVD (High-Definition Digital Versatile Disk), as will be known to a person skilled in the art. Compact projection units are being developed for such small lasers. An example of such a projection unit uses a micro scanning mirror that oscillates to deflect a modulated laser beam horizontally and vertically in order to generate an image on a backdrop.

Obvious advantages of laser-based projection systems are their compact size, energy efficiency, and low maintenance. Particularly the smaller types of laser projection system, such as those intended for portable/mobile use, do not require any complicated filtering or focussing optics.

The light output of a laser such as those described above can be directly controlled by application of a modulation signal, for example by modulating the input current to the laser as required. Since a high internal conversion efficiency is only obtained at high energy density, these types of laser devices are operated in a pulsed mode, in which short pulses are applied to the laser, resulting in a sequence of short light pulses being generated. As will be known to a person skilled in the art, the output energy is thereby concentrated, giving an increased energy density at a certain average level.

To obtain an image in which the pulsed method of driving is not noticeable to the viewer, the lasers must be pulsed at a sufficiently fast rate corresponding to the pixel frequency. This leads to bandwidth problems when such lasers are to be used to project images with high resolution and low flicker, for example movies encoded using PAL or HD standards. PAL encodes 720 by 576 pixels for every image, while high-definition television can encode at 1280 by 720 pixels or 1920 by 1080 pixels. The projected image must be refreshed at a rate of about 90 Hz in order to avoid flicker. For a PAL image, this results in a modulation bandwidth of at least 20 MHz. Projection of full HD images can require a bandwidth of up to 93 MHz. Obviously, such high bandwidth requirements result in expensive electronics overhead and control software.

It is therefore an object of the invention to provide a cost-effective, straightforward and efficient method of image projection.

SUMMARY OF THE INVENTION

To this end, the present invention describes an image projection method, which method comprises the steps of
a) obtaining an image pixel array for the image to be projected;
b) obtaining a plurality of pixel allocation arrays for the image pixel array, whereby each pixel allocation array comprises occupied elements and vacant elements;
c) generating a trigger pulse train for a laser light source according to a pixel allocation array, whereby a trigger pulse is generated for each occupied element of the pixel allocation array;
d) generating a modulation signal for the laser light source on the basis of the image pixel array;
e) switching the laser light source with the trigger pulse train and modulating the laser light source with the modulation signal to generate a laser light pulse sequence for a sub-frame image according to the pixel allocation array;
f) and scanning the laser light pulse sequence to traverse the display such that the sub-frame image is projected onto the display.

Thereby, the steps c) to f) are carried out for each pixel allocation array of the plurality of pixel allocation arrays so that the image appears on the display.

The term 'image pixel array' is used to refer to the pixel information describing a single image or frame, for example one of a sequence of images or frames in a movie. Such an image pixel array can be visualised as a two-dimensional array of elements or entries arranged in rows and columns, where each element contains information for a pixel on a display. The colour and intensity of a projected image pixel is ultimately controlled by the pixel information of the corresponding element in the image pixel array. For example, an image pixel array element can comprise RGB values for the amount of red, green and blue light to be projected for that pixel. An image pixel array can also comprise only the information pertaining to a monochrome image, e.g. only green or only red pixel information.

A 'pixel allocation array' is an array of entries, for example a two-dimensional array, in which some of the elements or entries are 'occupied' while the rest are empty or vacant, and may also be referred to as an 'occupation pattern' in the following. An 'occupied element' of a pixel allocation array is an element for which the corresponding image pixel will be projected, according to the pixel information, in the sub-image for that pixel allocation array. In other words, as long as the pixel information is not null, the modulation signal and the trigger pulse for that image pixel will result in the pixel being projected. A vacant element of a pixel allocation array, on the other hand, will not be projected, regardless of the image pixel content. It will be stressed at this point that a vacant or empty element of a pixel allocation array is not the same as an occupied element for which the allocated pixel information is null, i.e. for a pixel that is not to be illuminated. The occupied and vacant elements of the pixel allocation array govern the generation of the trigger pulse train—a trigger pulse is generated for an occupied element, while no trigger pulse is generated for a vacant element.

In the method according to the invention, each image pixel of the image pixel array is associated with an occupied element of at least one of the pixel allocation arrays. The allocation of the occupied elements of the pixel allocation arrays is done such that, if the pixel allocation arrays were to be (virtually) overlaid on one another, they would combine to give an array of entirely occupied elements, i.e. every image pixel will be projected according to its image pixel content.

Since a trigger pulse train for the laser light source is generated according to each pixel allocation array of the plurality of pixel allocation arrays in the method according to the invention, and each pixel allocation array corresponds to a different subset of the image pixels of the image pixel array, as a result a sequence of sub-frames is projected onto the display for each image, so that the viewer perceives the result as the entire image. A sub-frame image is projected for each pixel allocation array. In effect, the image is generated by the 'interleaving' or 'overlaying' of sub-frame images.

An obvious advantage of the method according to the invention is that the modulation signal can have a considerably lower frequency than would be required in a state of the art solution. This is because not every pixel of the image needs to be illuminated in every refresh or image cycle, instead, only some of the pixels are illuminated for each sub-frame image. Even when the minimum of two pixel allocation arrays are used for an image pixel array, with judicious allocation of the image content over the pixel allocation arrays, the frequency at which the modulation signal must be driven can effectively be halved. Evidently, the more pixel allocation arrays that are used for the image pixel array, the lower the modulation signal frequency can be.

Another advantage of the method according to the invention is that, when the image content is judiciously distributed over the pixel allocation arrays, the trigger pulse for the laser light source can be wider, i.e. the trigger pulse can persist for longer. In a pulsed laser solution in which all of the image pixels of the image are successively illuminated, the trigger pulse would have to be kept narrow to ensure that the laser light intended for one pixel would not 'corrupt' the neighbouring pixel, resulting in a higher modulation bandwidth. However, in the method according to the invention, 'occupied' entries of a pixel allocation array can be neighboured by 'vacant' entries, so that the trigger pulse width can be wider. As a result, advantageously, the laser light pulse is of longer duration, and more light is available to illuminate the pixel, resulting in an improvement in image brightness.

An appropriate image projection system comprises an image pixel array source for providing an image pixel array, and a source of a plurality of pixel allocation arrays for the image pixel array, whereby each pixel allocation array comprises occupied and vacant elements. The system according to the invention further comprises a trigger pulse train generator for generating a trigger pulse train for a laser light source according to a pixel allocation array, whereby a trigger pulse is generated for each occupied element of the pixel allocation array. The system also comprises a modulation signal generator for generating a modulation signal for the laser light source on the basis of the image pixel array, a laser control unit for switching the laser light source with the trigger pulse train and modulating the laser light source with the modulation signal to generate a laser light pulse sequence for a sub-frame image, and a scanning unit for scanning the laser light pulse sequence to traverse the display such that the sub-frame image is projected onto the display. The components of the image projection system are configured to project a plurality of sub-frame images so that the image appears on the display. As explained above, a sub-frame image is projected for each of the pixel allocation arrays.

The dependent claims and the subsequent description disclose particularly advantageous embodiments and features of the invention.

The method according to the invention can be used with various different types of laser light source. However, the described method is particularly suitable for use in conjunction with frequency-doubling semiconductor diode lasers e.g. vertical external cavity surface emitting lasers (VECSELS) owing to their advantageously compact and economical realisation. In a preferred embodiment of the invention, the image projection system utilizes one or more VECSELs as laser light source. In the following, therefore, but without restricting the invention in any way, the laser light source of the image projection system according to the invention is assumed to be a semiconductor diode laser emitting coherent light. Such laser light sources are becoming increasingly economical to manufacture, have a long lifetime, and are not subject to blackening or burnout, as is the case with state of the art UHP lamps, making their use particularly attractive from the consumer's point of view.

An image pixel array for an image can be visualised as a rectangular two-dimensional arrangement of image pixels or elements. As already described above, the content of an image pixel array describing an image is allocated to, or virtually distributed over, a number of pixel allocation arrays or occupation patterns. The pixel allocation arrays can be smaller than the image pixel array, and the different pixel allocation arrays can have different dimensions. However, in a preferred embodiment of the invention, each pixel allocation array has the same number of elements as the image pixel array, so that each element of the pixel allocation array, whether occupied or vacant, corresponds to an image pixel element of the image pixel array, so that the pixel allocation array can be directly used to generate the trigger pulse train.

Evidently, the number of occupied elements in a pixel allocation array or occupation pattern is essentially inversely proportional to the total number of pixel allocation arrays. For example, if four pixel allocation arrays are used for an image pixel array, any one of those pixel allocation arrays can be associated with a quarter of the image pixels.

The occupied elements of the plurality of pixel allocation arrays could be distributed in a block-wise manner. However, this might ultimately result in an undesirable flicker of the projected image. Therefore, in a particularly preferred embodiment of the invention, occupied elements are allocated in an essentially homogenous manner amongst the pixel allocation arrays, such that the pixel allocation arrays each have roughly the same amount of occupied elements. In other words, the image pixel information will be allocated more or less evenly over the plurality of pixel allocation arrays, and the pixel allocation arrays could theoretically be overlaid to give an entirely occupied array in which each element is associated with a pixel of the image pixel array. For example, in the case of two pixel allocation arrays for an image pixel array, the occupation patterns can comprise arrangements of alternating occupied and vacant entries, arranged in such a way that entries that are occupied in one pixel allocation array are vacant in the other. This homogenous distribution of occupied and vacant elements will later be described with the aid of the diagrams.

Furthermore, a sequence of neighbouring occupied elements in a pixel allocation array would mean that the trigger pulse width for the corresponding image pixels would have to be quite narrow, as already explained. It would be more advantageous if an occupied entry of the pixel allocation array is neighboured by vacant entries (when considering a 'row' of the pixel allocation array), so that the trigger pulse is off for the corresponding preceding and subsequent pixels. Furthermore, the quality of the projected image may be improved if the entries 'above' and 'below' the occupied entry are vacant entries (when considering a 'column' of the pixel allocation array). Therefore, in a further particularly preferred embodiment of the invention, the occupied elements of a pixel allocation array are arranged or distributed among the vacant elements of the pixel allocation array in an alternating or staggered fashion, reminiscent of a chessboard or checkerboard pattern, whereby the gaps between occupied elements in the pixel allocation array can comprise several vacant elements. For example, in a solution with four pixel allocation arrays, every fourth element of a pixel allocation array can be allocated to the corresponding image pixel entry of the image pixel array, and the intervening elements are left blank, or vacant. A judicious choice of occupation pattern might be such that an image pixel entry in a row is assigned to be offset from an image pixel entry in the row above or below. Again, this will be described later with the visual aid of the diagrams. The occupied and vacant entries of the pixel allocation array can also be arranged according to scanner capabilities, for example to give Lissajous figures.

As mentioned above, savings in bandwidth can be achieved using the method according to the invention, since only a fraction of the image pixels are illuminated in each sub-frame image. In state of the art projection systems, where each pixel of the image is illuminated in each refresh cycle, the modulation signal for the laser light source must react rapidly. In the method according to the invention, the modulation signal for a laser light source need only settle to the required pixel value when the trigger pulse is active. Therefore, in a particularly preferred embodiment of the invention the modulation signal is generated on the basis of the pixel allocation array. Evidently, the greater the number of pixel allocation arrays, the more savings can be made in bandwidth. For example, in the case of six pixel allocation arrays, the bandwidth can be reduced by up to a factor of six, while still providing a good quality image without discernible small area flicker. For a greater number of pixel allocation arrays, the savings in bandwidth may be less, but better advantage can be taken of the properties of the VECSEL lasers, since these are most efficient when pulsed at high frequencies.

Occupation patterns could be computed for each image pixel array of a sequence of image pixel arrays, for example a video input stream. Obviously, this would require computational effort. Preferably, predefined occupation patterns, retrieved for example from a memory, can be applied to each image pixel array. The projection quality requirements may change between video streams or even during a video stream. Therefore, the number of occupation patterns being applied to the image pixel arrays can adapted, for example retrieving a higher number of occupation patterns for high-quality image requirements, and less occupation patterns for lower quality requirements.

As already explained, a pulsed laser light source of the type described emits light according to the amplitude of its modulation signal whenever the laser light source is triggered. Naturally, the laser light source could be triggered at every pixel, even though its modulation signal switches much less frequently, but this would not take advantage of the 'gaps' between occupied entries in the pixel allocation array, i.e. the intervals for which corresponding pixels are not to be illuminated. For example, in the case of two allocation arrays for an image pixel array, every second pixel in a sub-frame image is not illuminated, and therefore the laser light source need not be triggered for these pixels. Therefore, in a preferred embodiment of the invention, the duty cycle of the trigger pulse train is chosen according to the number of pixel allocation arrays, so that, if N pixel allocation arrays are used for the image pixel array, and the image pixel entries are allocated in the manner described above, a duty cycle of 1/N for the trigger pulse train is sufficient. For example, in the case of four pixel allocation arrays, every fourth entry in a pixel allocation array is associated with an image pixel entry for a pixel to be illuminated, so that it is sufficient for the trigger pulse train to be active only every fourth pixel, corresponding to a 25% duty cycle, or one quarter. In the case of five pixel allocation arrays, a duty cycle of 20% is sufficient, and so on.

The pulsed laser light can be guided or deflected by a scanning unit, as will be known to a person skilled in the art, to traverse the display so that pixels are successively illuminated on the display. Basically, it is not really relevant in which order the pixels are illuminated. However, use of existing scanning technology would be advantageous. Since most state of the art scanners are configured to traverse a display from left to right and from top to bottom, in a preferred embodiment of the invention the laser light pulse sequence is scanned to traverse the display in a horizontal manner. In other words, the laser light can travel back and forth in a zig-zag manner across the rows of the display, for example starting in one corner and moving back and forth, to successively illuminate pixels on the display according to the laser light pulse sequence. Alternatively, the scanning unit can be realised to produce any other trajectory, depending on its capabilities, and a corresponding pattern on the display.

As will be known to a person skilled in the art, an image pixel may comprise information for the light primaries with which the colour of the pixel will be rendered. For example, in an RGB colour system, the light primaries are red, green and blue, and an image pixel is described by its proportions of red, blue and green. In a pulsed laser projection system according to the invention, a number of separate laser light sources can be used, one for each primary light colour. Since the proportions of red, blue and green can be different for each image pixel, each laser is preferably modulated by a separate or dedicated modulation signal. In the method according to the invention, therefore, a separate modulation signal is generated for each laser light source of a plurality of laser light sources.

State of the art projection systems generate separate red, blue and green images, for example projection systems that use a white light source and a colour wheel, or separate primary colour light sources. These primary colour images can be projected onto the screen in rapid succession and are perceived as a full colour image by the viewer, or generated on separate display panels before being combined, as in the case of three-panel LCD systems. In the projection system according to the invention, however, the laser light pulse sequences can be combined before projection to give a full colour pulse sequence, so that each pixel of the image is already of the correct colour and intensity before actually being projected onto the display, and the resulting pulse sequence, for example, can be forwarded to a scanning unit comprising a micro scanning mirror by means of an optical fibre connection. However, it is also possible to apply the described method in a system in which the red, green and blue images are projected separately onto the display.

When an image pixel is generated by causing up to three laser light pulses to be simultaneously generated, each pulse having the appropriate intensity for the image pixel's colour, the laser light sources can all be pulsed at the same instant. Evidently, each laser light source can avail of its own trigger pulse. However, savings in overhead can be achieved when a trigger pulse is shared by the laser light sources. Therefore, in a preferred embodiment of the invention, a single shared trigger pulse train is used to switch each laser light source of a plurality of laser light sources, so that a further reduction in system requirements can be obtained. A person skilled in the art will also be aware that an image projection system using such a shared trigger pulse train will need sufficiently precise optics, free of any colour distortion, for example with a chromatic aberration of less than one pixel. In the above mentioned example of an optical fibre connection and a micro scanning mirror, the light pulse sequence can pass essentially without any distortion. Triggering the laser light sources simultaneously has the added advantage that the light pulses for each of the colours of a pixel are of the same length, so that there is essentially no colour overlap at the edges of a pixel, which may be the case for state of the art sequential colour displays in which red, green and blue images are generated in rapid succession. Colour break-up is also not an issue, unlike in state of the art time-sequential systems using, for example, digital light processing (DLP) technology. However, optical systems based on lenses and prisms may result in magnification or deflection, depending on the wavelengths of the light generated by the laser light sources. In such a system, it may be preferable to trigger each laser light source separately, so that slight adjustments to the trigger pulse sequences can compensate for inadequacies of the optics. Another reason for choosing to trigger each laser light source separately might be to obtain a smoother power flow, particularly at very high pulsing frequencies. An example of such an embodiment might be, in the case of three allocation arrays, to pulse the three primary colours sequentially, using each of the allocation arrays in sequence, so that the three pulses produce three neighbouring pixels. The advantage of this embodiment is a particularly smooth power flow.

Other objects and features of the present invention will become apparent from the following detailed descriptions considered in conjunction with the accompanying drawings. It is to be understood, however, that the drawings are designed solely for the purposes of illustration and not as a definition of the limits of the invention.

BRIEF DESCRIPTION OF THE DRAWINGS

In the drawings, like numbers refer to like objects throughout. Objects in the diagrams are not necessarily drawn to scale.

DETAILED DESCRIPTION OF THE EMBODIMENTS

Figure 1:
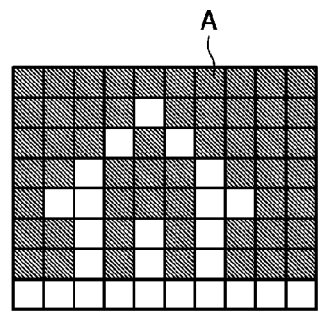
FIG. 1 shows a simplified representation of an image pixel array.

FIG. 1 shows a very simplified image pixel array A. For the purposes of illustration, a white square in the array is intended to indicate a pixel that will be illuminated in the display, and a 'black' square (dense cross-hatching) indicates a pixel that is not illuminated. Evidently, an image can be in full colour, and not monochrome as indicated here. Furthermore, a pixel array for practical purposes will be much larger, for example a 720 by 576 array of pixels when using the PAL standard, or 1920 by 1080 for full HD.

Figure 2A:
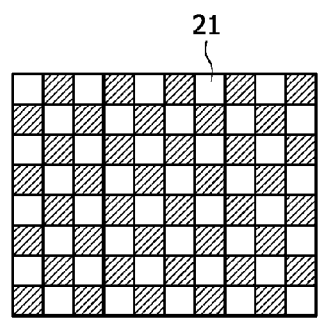
FIG. 2a and FIG. 2b show pixel allocation arrays for the image pixel array of FIG. 1 for projection as two sub-frame images.
Figure 2B:
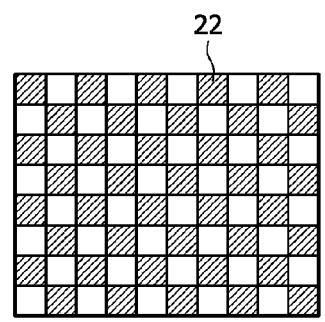

FIG. 2a and FIG. 2b show two pixel allocation arrays 21, 22 or occupation patterns 21, 22 for the case when the image pixel array A of FIG. 1 is to be projected as two sub-frame images. In the diagrams, entries of a pixel allocation array corresponding to pixels that are to be illuminated in a sub-frame (according to their value in the image pixel array A) are indicated as white fields. In other words, these fields are 'occupied', and correspond to those pixels for which a modulation signal may be generated. The remaining entries, corresponding to pixels of the image pixel array A that are not to be illuminated in that sub-frame, are shown as cross-hatched fields. In other words, these fields are 'vacant'. In this case of two sub-frame images and therefore two occupation patters, alternating array entries are left vacant. When the occupation patterns 21, 22 are imagined to be overlaid, the result would be an entirely white rectangle.

Figure 3A:
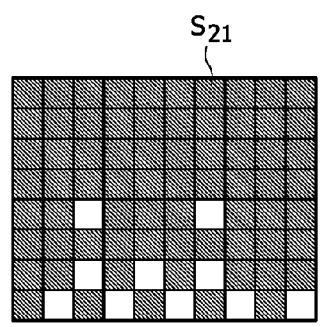
FIG. 3a and FIG. 3b show sub-frame images for the image pixel array of FIG. 1, projected using the pixel allocation arrays of FIGS. 2a and 2b.
Figure 3B:
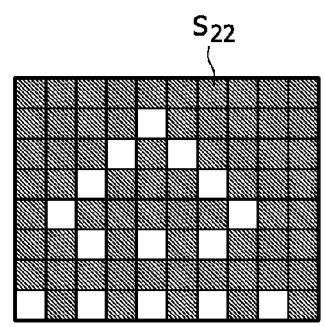

The sub-frame images $S_{21}$, $S_{22}$ for the image pixel array A, using the occupation patterns 21, 22, are shown in FIGS. 3a and 3b, respectively. Each of these sub-frames $S_{21}$, $S_{22}$ is the combined result of the trigger pulse and the non-zero modulation signal for that sub-frame. Each illuminated pixel of a sub-frame image $S_{21}$, $S_{22}$ has a matching occupied entry in the corresponding occupation pattern 21, 22. Pixels of the image pixel array A that are not to be illuminated are regarded as vacant pixel allocation array entries, since the pixel information for such pixels corresponds effectively to a vacant entry. When the sub-frame images $S_{21}$, $S_{22}$ are imagined to be overlaid, the result would be the complete image pixel array A. Again, the diagram is limited to a black-and-white representation, but, in practice, the pixels could have grey-scale and colour values.

Figure 4A:
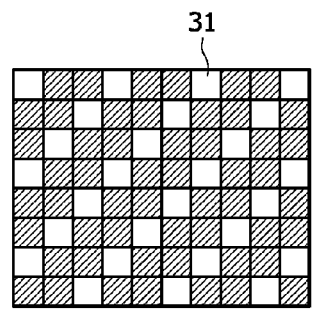
FIG. 4a, FIG. 4b and FIG. 4c show pixel allocation arrays for the image pixel array of FIG. 1 for projection as three sub-frame images.
Figure 4B:
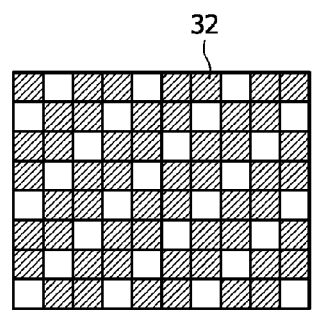
Figure 4C:
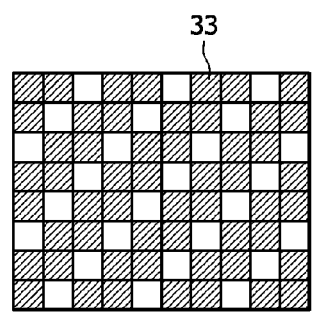

FIGS. 4a-4c show three occupation patterns 31, 32, 33 for the case when the image pixel array A is to be projected using a total of three sub-images. Again, as described for FIGS. 2a and 2b above, entries of a pixel allocation array corresponding to pixels that are to be illuminated in a sub-frame (according to their value in the image pixel array A) correspond to those pixels for which a modulation signal may be generated and are indicated as white fields. The remaining entries, corresponding to pixels of the image pixel array A that are not to be illuminated in that sub-frame, are shown as cross-hatched fields. In this example, every third pixel allocation array element will be allocated to the corresponding image pixel array element, and the intervening entries are left vacant. When the occupation patterns 31, 32, 33 are imagined to be overlaid, the result would be an entirely white rectangle.

Figure 5A:
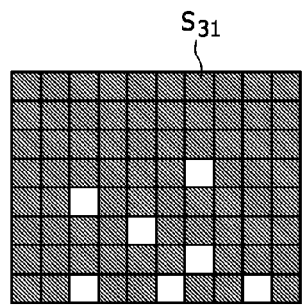
FIG. 5a, FIG. 5b and FIG. 5c show sub-frame images for the image pixel array of FIG. 1, projected using the pixel allocation arrays of FIGS. 4a, 4b and 4c.
Figure 5B:
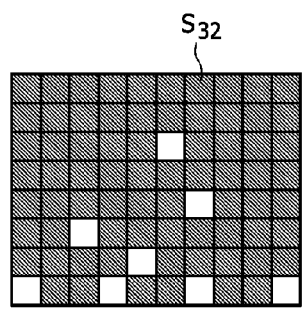
Figure 5C:
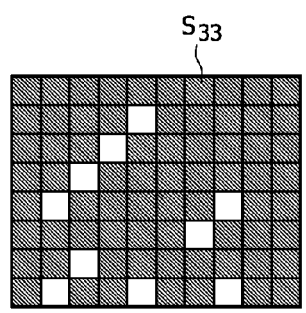

The sub-frame images $S_{31}$, $S_{32}$, $S_{33}$ for the image pixel array A, using the occupation patterns 31, 32, 33, are shown in FIG. 5a, FIG. 5b and FIG. 5c respectively. Each of these sub-frames $S_{31}$, $S_{32}$, $S_{33}$ is the combined result of the trigger pulse and the non-zero modulation signal for that sub-frame. Each pixel of a sub-frame image $S_{31}$, $S_{32}$, $S_{33}$ has a matching occupied entry in the corresponding occupation pattern 31, 32, 33. When the sub-frame images $S_{31}$, $S_{32}$, $S_{33}$ are imagined to be overlaid, the result would be the complete image pixel array A.

Even when the image pixel array A were to be distributed over a greater number of sub-frames, the principle remains the same. Evidently, occupation patterns and therefore sub-frame array distributions other than those shown here are possible.

The image pixels of the sub-frame arrays shown are projected onto a display by causing a corresponding sequence of laser light pulses to be generated and scanned across the display. Before explaining the method according to the invention, a possible approach will first be explained with the aid of FIG. 6, which shows part of an image pixel array A' or light pattern A', a corresponding modulation signal 60, and a trigger pulse train 61 for a VECSEL laser. In this approach, the trigger pulse train 61 triggers a laser light source successively for each pixel, and the modulation signal 60 controls the intensity of the laser output. In the diagram, to keep things simple, only four rows of pixels are shown in the image pixel array A'. In the first row of the image pixel array A', pixels are alternately on or off. In the second row, successive pairs of pixels are on and then off, in the third row, three 'off' pixels are followed by three 'on' pixels, etc. The modulation signal 60 is shown for these four rows in the corresponding order. It can be seen from the diagram that, whenever the modulation signal is active or high, the corresponding pixel is illuminated. A resulting laser light pulse sequence is scanned to traverse the display (not shown in the diagram) from left to right to generate the light pattern A' shown. As can be seen in the diagram, the trigger pulses must of necessity be quite narrow for VECSEL energy conversion efficiency. Usually, the trigger pulse is only active for one third of the pixel. This means that the system cannot make optimal use of the intensity of the laser light source used. Furthermore, the modulation signal 60 must be switched very rapidly, since it must adjust in time from one pixel to the next.

For the sake of clarity, this diagram only shows a modulation signal for a monochrome pattern A'. Obviously, full colour image projection requires a modulation signal for each of the light primaries. Similarly, in the following FIG. 7 and FIG. 8, in which the method according to the invention is described in more detail, only a single modulation signal—for example for one of the laser light sources—is shown for each sub-frame image. It will be obvious to a person skilled in the art that an image pixel array will usually comprise full colour pixels, so that each primary colour laser light source will require its own modulation signal in order to obtain the desired colour for each pixel. Evidently, the modulation signals of all the primary laser light sources can be different in amplitude and phase. However, for the purposes of illustration, only a single modulation signal is shown, without restricting the invention in any way.

Figure 6:
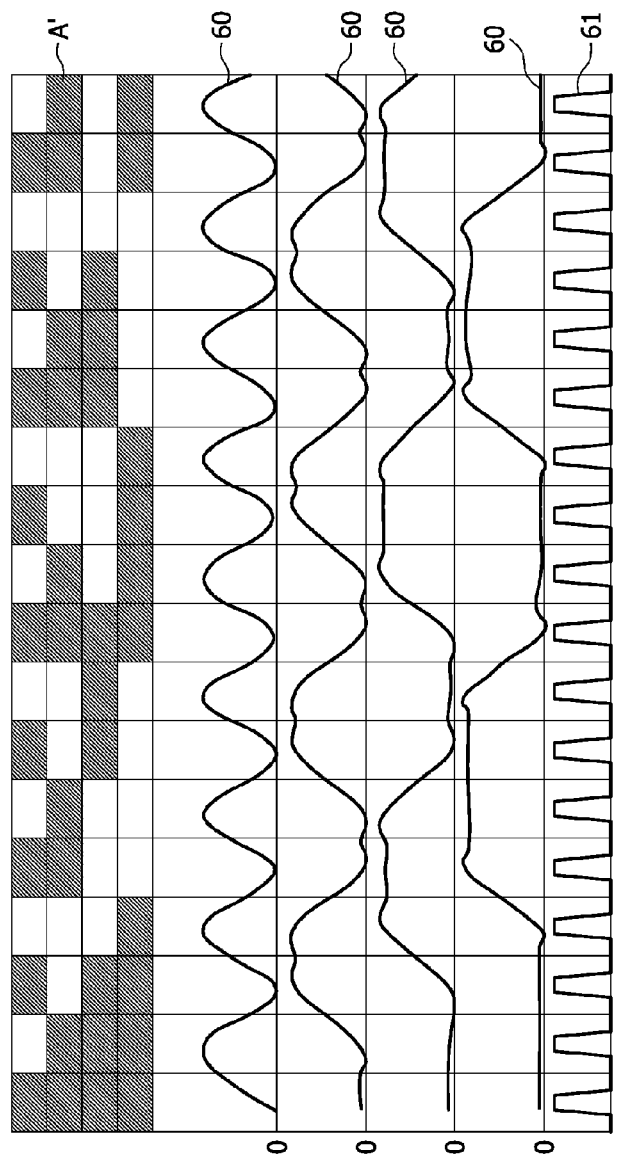
FIG. 6 shows a light pattern, a corresponding modulation signal, and a trigger pulse train for an image pixel array in a state of the art image projection system.
Figure 7:
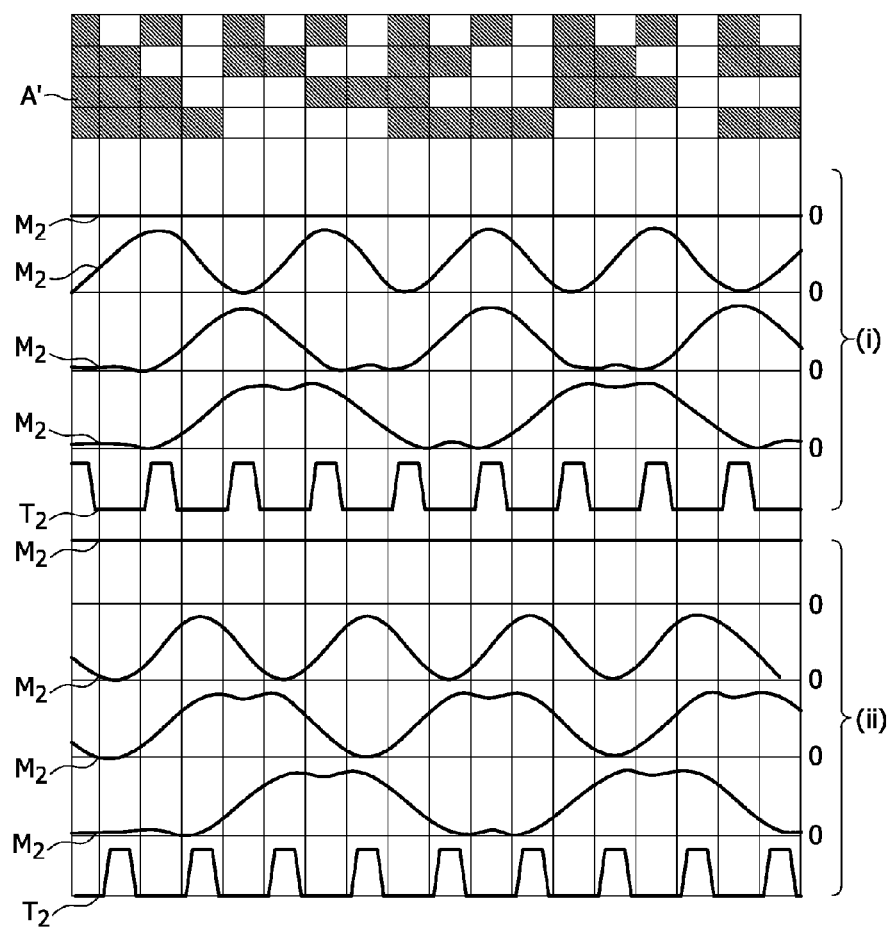
FIG. 7 shows a light pattern, a modulation signal for a first and second sub-frame, and a trigger pulse train for an image pixel array distributed over two sub-frames using the method according to the invention.

FIG. 7 shows the same image pixel array A' that was described for FIG. 6 above. The image pixel array A', according to an exemplary embodiment of the invention, is to be projected as two sub-frame images using occupation patterns such as those described in FIG. 2a and FIG. 2b, where every alternate element is allocated to image pixel information, and every other element is left vacant. In the upper region of FIG. 7, denoted by (i) in the diagram, the first sub-frame image is to be projected. To this end, a modulation signal $M_2$ is generated according to the first pixel allocation array. A trigger pulse train $T_2$ with 50% duty cycle is generated, so that only every second pixel is illuminated, according to the occupation patterns as already described above. A trigger pulse is generated for each occupied element of the pixel allocation array, and, whenever a trigger pulse coincides with an active or high region in the modulation signal $M_2$, a laser light pulse is generated, so that the corresponding pixel in the display will be illuminated. At the same time, modulation signals for the other primary colours laser light sources are generated according to the first pixel allocation array and applied with the trigger pulse train $T_2$ to the blue and green lasers, so that the first sub-frame image is projected in full colour.

In the region denoted (ii) in the diagram, the modulation signal $M_2$ generated for the second pixel allocation array can be seen. For this second pixel allocation array, the trigger pulse train $T_2$ is phase-shifted by one pixel in order to make it possible to illuminate those pixels that were not illuminated for the first pixel allocation array. Again, whenever a trigger pulse coincides with an active or high region in the second modulation signal $M_2$, a laser light pulse is generated, and the corresponding pixel in the display will be illuminated. As already explained, modulation signals for the blue and green laser light sources are generated at the same time according to the second pixel allocation array and applied with the phase-shifted trigger pulse train $T_2$ to the blue and green lasers, so that a second sub-frame image is projected in full colour.

Since the first and second sub-frame images are projected at high speed onto the display, the viewer perceives the image in its entirety.

Figure 8:
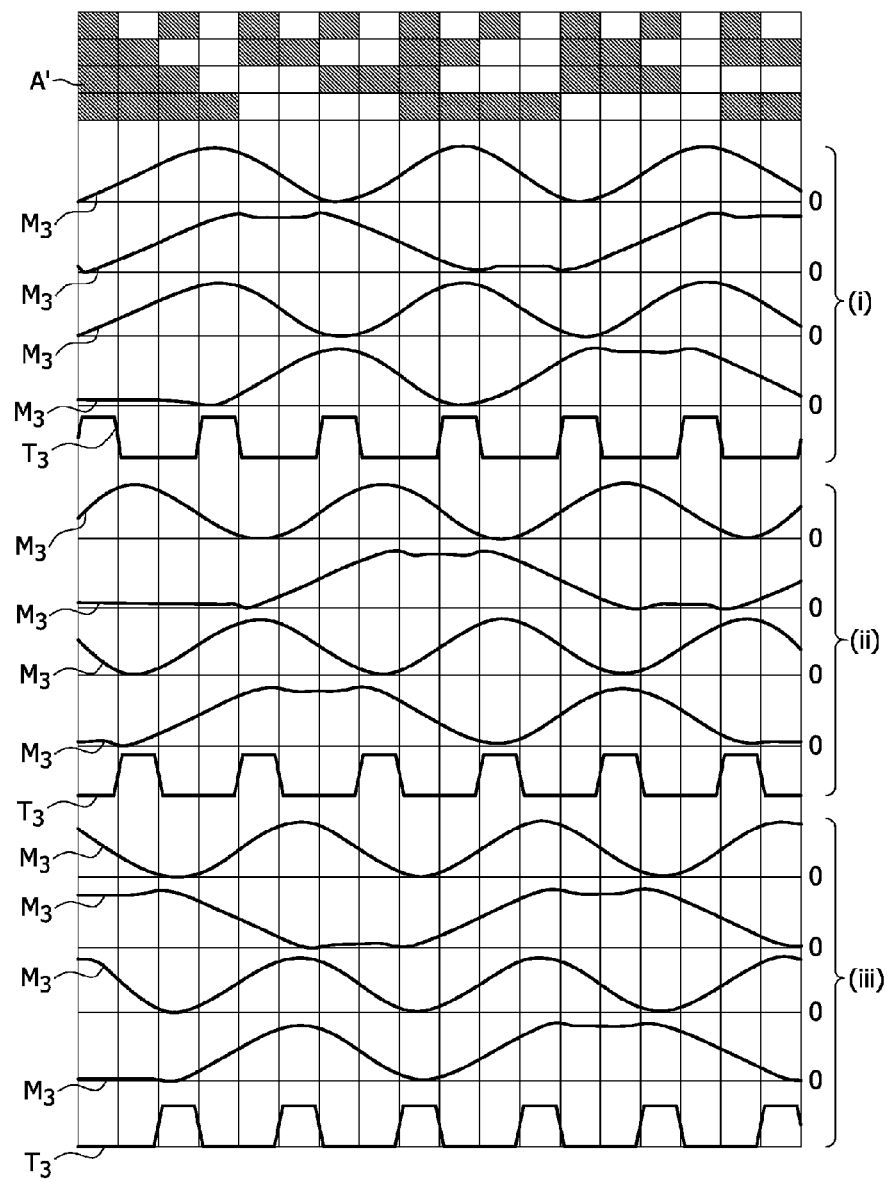
FIG. 8 shows a light pattern, a modulation signal for a first sub-frame, a second sub-frame and a third sub-frame, and a trigger pulse train for an image pixel array distributed over three sub-frames using the method according to the invention.

FIG. 8 shows the same image pixel array A', but this time the image pixel array A' is projected as three sub-frame images, according to a further exemplary embodiment of the invention. Occupation patterns such as those shown in FIGS. 4a-4c are used in the projection of the sub-frame images, where only every third entry is allocated image pixel information, and the intervening entries remain vacant.

In the region denoted by (i) in FIG. 8, a modulation signal $M_3$ is shown for a first primary colour laser light source for the first pixel allocation array (again, it will be stressed that each primary colour laser light source will in actual fact have its own modulation signal for a pixel allocation array). A trigger pulse train $T_3$ generates a sequence of trigger pulses at a 33% duty cycle, so that only every third pixel can be illuminated. A pixel of the first sub-frame image is illuminated whenever a trigger pulse of the trigger pulse train $T_3$ coincides with a non-zero modulation signal $M_3$. For the second sub-frame image, as shown in the region denoted by (ii) in the diagram, the trigger pulse train $T_3$ is shifted by one pixel, and the modulation signal $M_3$ is generated for the second pixel allocation array. In the same way, the third sub-frame image is projected using the trigger pulse train $T_3$, again shifted by one pixel, and the modulation signal $M_3$ for the third pixel allocation array, as shown in the region denoted by (iii) in the diagram.

Figure 9:
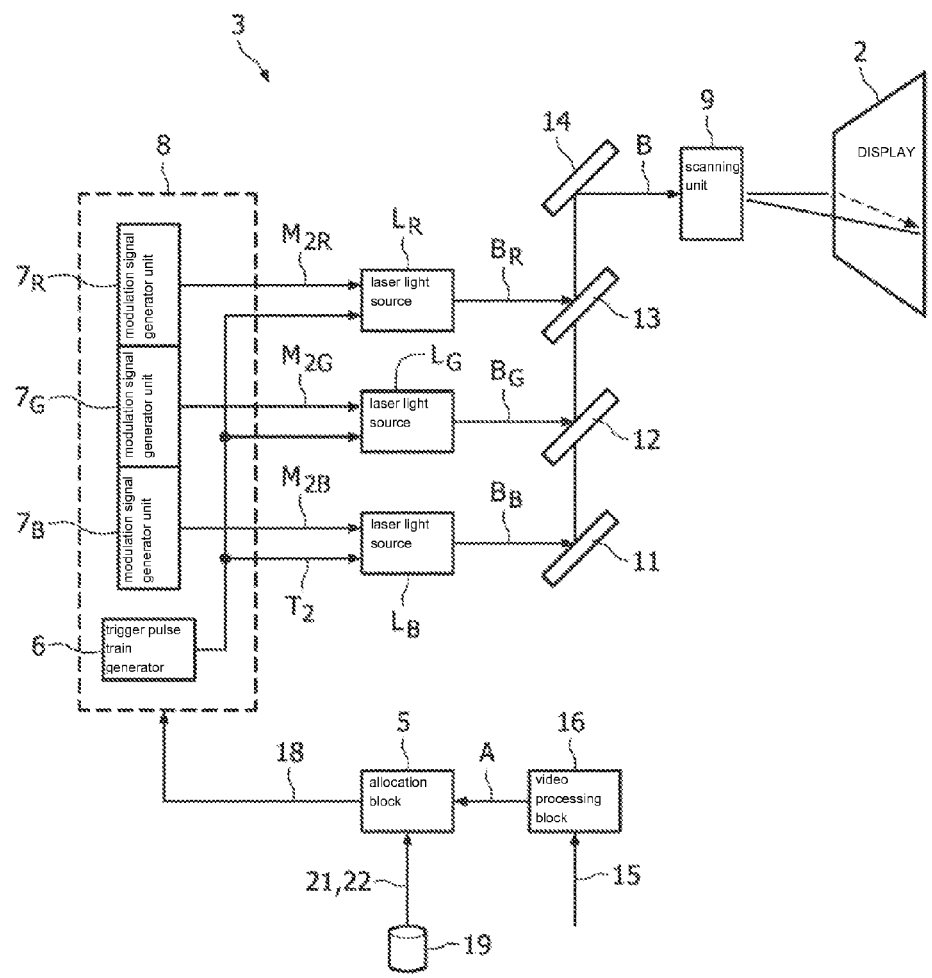
FIG. 9 shows an embodiment of an image projection system according to the invention.

The basic operation of an embodiment of a projection system according to the invention is now explained with the aid of FIG. 9. This diagram shows a number of laser light sources $L_R$, $L_G$, $L_B$ and a system 11, 12, 13, 14 of mirrors and filters for combining primary colour light beams $B_R$, $B_G$, $B_B$ to give a combined beam B of coloured laser light. The laser light sources $L_R$, $L_G$, $L_B$ in this example are pulsed VECSELS $L_R$, $L_G$, $L_B$. In this example, a movie is to be projected onto a display 2, and each image is to be projected as two sub-frame images in rapid succession using the method according to the invention.

An input video stream 15 is processed in a video processing block 16 to obtain a series of image pixel arrays from the video stream corresponding to a series of images to be projected onto the display 2. Each image pixel array A is output from the video processing block 16 and forwarded to an allocation block 5. Since each image is to be projected as two sub-frame images, two pixel allocation arrays 21, 22 or occupation patterns 21, 22 to be used for allocating image pixel array entries are retrieved from a memory 19. The allocation block 5 provides an output information signal 18 which is forwarded to a laser control unit 8, which comprises modulation signal generator units $7_R$, $7_G$, $7_B$ for each of the laser light sources $L_R$, $L_G$, $L_B$ and a trigger pulse train generator 6. Of course, the components 6, $7_R$, $7_G$, $7_B$ need not necessarily be realised in a single unit 8 but can be separate. The output information signal 18 comprises control and timing information for the trigger pulse train generator 6, and also includes corresponding control information for each of the modulation signal generator units $7_R$, $7_G$, $7_B$ so that each laser light source $L_R$, $L_G$, $L_B$ can be deactivated or modulated by the appropriate amount for every trigger pulse and for each sub-frame image.

Modulation signals $M_{2R}$, $M_{2G}$, $M_{2B}$ for controlling the light output of each of the VECSELS $L_R$, $L_G$, $L_B$ are therefore generated according to the information carried in the output information signal 18. In other words, a red modulation signal $M_{2R}$ is generated for the red laser $L_R$, a green modulation signal $M_{2G}$ is generated for the green laser $L_G$, and a blue modulation signal $M_{2B}$ is generated for the blue laser $L_B$ according to the image pixel information in the current sub-frame array. A trigger pulse train $T_2$, with a 50% duty cycle since two sub-images are being projected, is generated in the trigger pulse train generator 6, and the trigger pulse $T_2$ is phase-shifted by one pixel for each new sub-frame. The point in time at which the trigger pulse $T_2$ is phase-shifted can also be indicated by the output information signal 18.

The combined laser light beam B is deflected by a scanning unit 9 comprising, for instance, a micro-scanning mirror, to traverse the display 2 in a controlled manner, for example from left to right and from top to bottom, so that the sub-frames are projected onto the display where they are perceived as entire images by the viewer.

It will be known to a person skilled in the art that several of the components shown, for example modulation signal generator units $7_R$, $7_G$, $7_B$, trigger pulse train generator 6, scanning unit 9, etc., will need to be synchronised to each other in order to project an image onto the display. Furthermore, the number of occupation patterns to be used in projecting an image or movie can be pre-determined, for example a factory setting, or can be selected by a user, for example as a means of adjusting the image quality.

Figure 10:
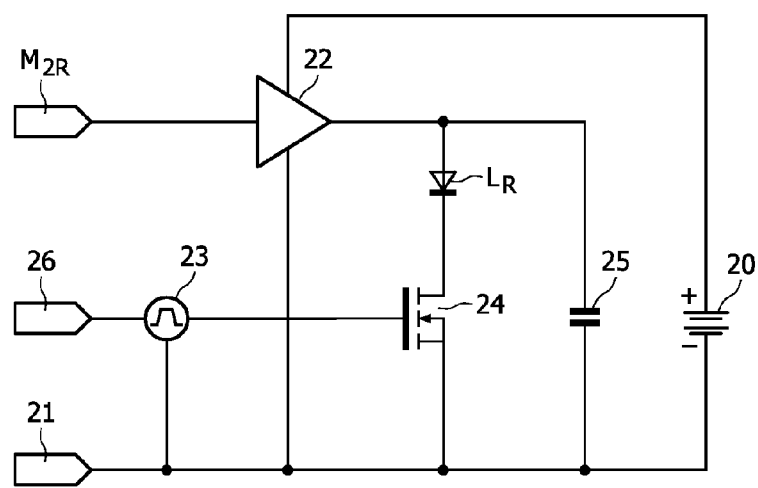
FIG. 10 shows an example realisation of driver electronics for a pulsed laser for use in the image projection system of FIG. 9.

FIG. 10 shows an example realisation of driver electronics for one of the lasers $L_R$, $L_G$, $L_B$ shown in FIG. 9 above. In this example, the red laser $L_R$ is shown. Here, the pixel power for a red component of a pixel is controlled by the modulation signal $M_{2R}$, which is connected to one input of an amplifier 22. The amplifier 22 is fed by a power supply 20. The circuit is connected in the usual manner to ground 21. The output of the amplifier 22 feeds an energy storage means 25 (in this example a capacitor 25) to supply pulses to the semiconductor laser $L_R$. The laser is pulsed by a trigger pulse input 26 synchronised to a pixel clock signal. The laser is enabled by the switch 24, and the duration of activation, i.e. the width of the trigger pulse is controlled by the trigger 23 (it will be clear to a person skilled in the art that the trigger pulse input 26 and the trigger 23 act together as the trigger pulse train generator described in FIG. 9 above, since they provide the trigger pulse train for control of the switch 24). A laser light pulse is generated whenever the trigger pulse is active. By using the capacitor 25 to store energy, the amplifier 22 need only supply the average current to the energy storage means 25, and does not have to be designed for the higher pulse current required for efficient VECSEL operation.

Figure 11:
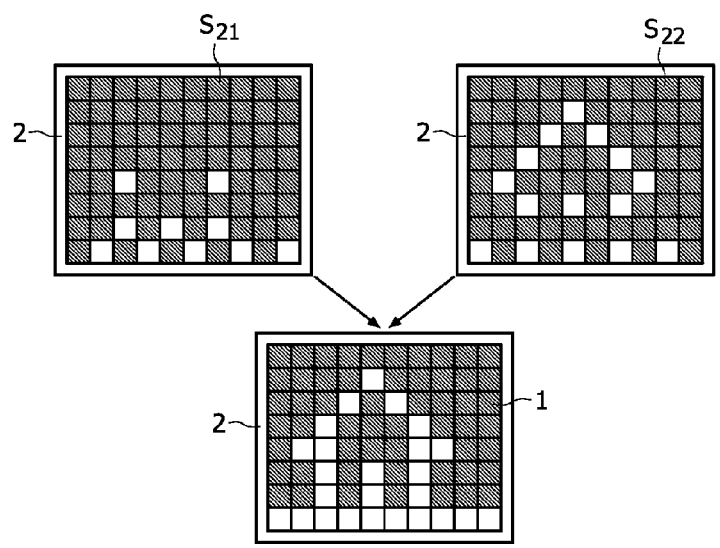
FIG. 11 shows the projection of an image for which the image pixel array has been distributed over two sub-frame arrays.

FIG. 11 illustrates again the projection of an image 1 for which the image pixel array A of FIG. 1 is projected as two sub-frame images $S_{21}$, $S_{22}$ in the interleaved manner described above onto a display 2, where they are perceived by the viewer as a single image 1, as indicated by the arrows in the diagram.

Figure 12:
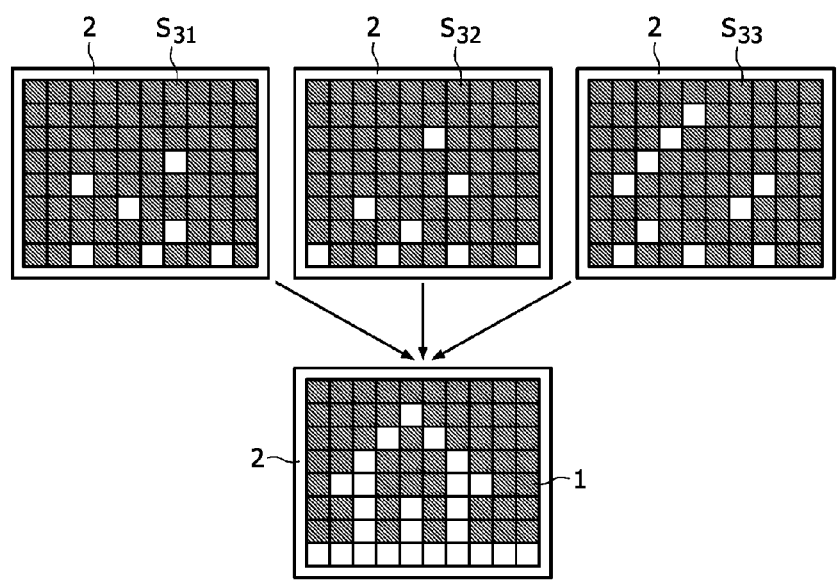
FIG. 12 shows the projection of an image for which the image pixel array has been distributed over three sub-frame arrays.

Similarly, FIG. 12 shows the projection of the image 1 for which the image pixel array A of FIG. 1 is projected as three sub-frames $S_{31}$, $S_{32}$, $S_{33}$, which are perceived by the viewer as a single image 1, as indicated by the arrows.

As mentioned above, the reduction in modulation signal frequency and trigger pulse width made possible by the method according to the invention lead to an advantageous reduction in bandwidth requirements. The projected image must be refreshed at a certain minimum rate to ensure that the viewer does not perceive flicker. In the method according to the invention, only a fraction of the image content is projected for a sub-frame in each cycle. Since the laser light source need only be pulsed for each pixel that is being displayed in a sub-frame, and not for every pixel, the bandwidth is reduced in direct proportion to the number of sub-frame arrays over which the image pixel array is distributed. When the image pixel array is disassembled to give two sub-images, the bandwidth requirements can be reduced by half. In the case of three sub-images, only one third of the otherwise required bandwidth might be needed. The image to be projected can be deconstructed into even more sub-images, for example, up to 16. Therefore, the required bandwidth of an image projection system operated according to this method can effectively be decreased by a factor of at least two. This has the advantage of posing less hardware system requirements, so that an image projection system that implements the method according to the invention can be realised at considerably lower cost.

Although the present invention has been disclosed in the form of preferred embodiments and variations thereon, it will be understood that numerous additional modifications and variations could be made thereto without departing from the scope of the invention.

The invention claimed is:

1. An image projection method for projecting an image onto a display, the method comprising the steps of:
   a) obtaining an image pixel array for the image to be projected;
   b) obtaining a plurality of pixel allocation arrays for the image pixel array, each pixel allocation array including occupied elements and vacant elements;
   c) generating a trigger pulse train for a laser light source according to a pixel allocation array, whereby a trigger pulse is generated for each occupied element of the pixel allocation array;
   d) generating a modulation signal for the laser light source on the basis of the image pixel array;
   e) switching the laser light source with the trigger pulse train and modulating the laser light source with the modulation signal to generate a laser light pulse sequence for a sub-frame image; and
   f) scanning the laser light pulse sequence to traverse the display such that the sub-frame image is projected onto the display; wherein
   the steps c) to f) are carried out for each pixel allocation array of the plurality of pixel allocation arrays so that the image appears on the display.

2. An image projection method according to claim 1, wherein the modulation signal for the laser light source is generated on the basis of the pixel allocation array.

3. An image projection method according to claim 1, wherein each pixel allocation array is of the same dimension as the image pixel array.

4. An image projection method according to claim 1, wherein the occupied elements of the pixel allocation arrays are distributed in an essentially homogenous manner over the pixel allocation arrays.

5. An image projection method according to claim 1, wherein the occupied elements of a pixel allocation array are arranged in a staggered fashion among the vacant elements of the pixel allocation array.

6. An image projection method according to claim 1, wherein the duty cycle of the trigger pulse train is chosen according to the number of pixel allocation arrays.

7. An image projection method according to claim 1, wherein the laser light pulse sequence is scanned to traverse the display in a horizontal manner.

8. An image projection method according to claim 1, wherein the laser light sources of a plurality of laser light sources are switched by a shared trigger pulse train.

9. An image projection system comprising
   an image pixel array source for providing an image pixel array;
   a source of a plurality of pixel allocation arrays for the image pixel array, whereby each pixel allocation array comprises occupied and vacant elements;
   a trigger pulse train generator (6) for generating a trigger pulse train for a laser light source according to a pixel allocation array, whereby a trigger pulse is generated for each occupied element of the pixel allocation array;
   a modulation signal generator for generating a modulation signal for the laser light source on the basis of the image pixel array;
   a laser control unit for switching the laser light source with the trigger pulse train and modulating the laser light source with the modulation signal to generate a laser light pulse sequence for a sub-frame image; and
   a scanning unit for scanning the laser light pulse sequence to traverse the display such that the sub-frame image is projected onto the display,
   wherein the components of the image projection system are configured to project a plurality of sub-frame images so that the image appears on the display.

10. An image projection system according to claim 9, comprising a plurality of laser light sources for generating primary colour light beams ($B_R$, $B_G$, $B_B$), and a corresponding plurality of modulation signal generators for generating a separate modulation signal for each laser light source of the plurality of laser light sources.

* * * * *